United States Patent
Long et al.

(10) Patent No.: US 12,323,398 B2
(45) Date of Patent: Jun. 3, 2025

(54) MULTI-PROTOCOL MIGRATION SYSTEM AND METHOD

(71) Applicant: EMC IP Holding Company, LLC, Hopkinton, MA (US)

(72) Inventors: Fei Long, Shanghai (CN); John Duncan Bankier, Glasgow (GB); Ronald Brown, Fife (GB)

(73) Assignee: EMC IP Holding Company, LLC, Hopkinton, MA (US)

(*) Notice: Subject to any disclaimer, the term of this patent is extended or adjusted under 35 U.S.C. 154(b) by 475 days.

(21) Appl. No.: 17/727,105

(22) Filed: Apr. 22, 2022

(65) Prior Publication Data

US 2023/0344805 A1    Oct. 26, 2023

(51) Int. Cl.
*H04L 9/40* (2022.01)
*G06F 16/11* (2019.01)

(52) U.S. Cl.
CPC ........ *H04L 63/0428* (2013.01); *G06F 16/119* (2019.01)

(58) Field of Classification Search
CPC ............................ H04L 63/0428; G06F 16/119
See application file for complete search history.

(56) References Cited

U.S. PATENT DOCUMENTS

| | | | | |
|---|---|---|---|---|
| 9,755,938 B1 * | 9/2017 | Laporte | ............... | H04L 41/0681 |
| 9,904,602 B1 * | 2/2018 | Auchmoody | ....... | G06F 21/6227 |
| 2006/0090049 A1 * | 4/2006 | Saika | .................... | G06F 3/0605 |
| | | | | 711/165 |
| 2007/0055715 A1 * | 3/2007 | Achiwa | ................. | G06F 16/119 |
| 2009/0089335 A1 * | 4/2009 | Shitomi | ................ | G06F 16/119 |
| 2013/0103787 A1 * | 4/2013 | Glover | .................. | G06F 9/5083 |
| | | | | 709/217 |
| 2017/0235802 A1 * | 8/2017 | Vully | .................... | G06F 16/119 |
| | | | | 707/809 |
| 2019/0042407 A1 * | 2/2019 | Gao | ........................ | G06F 3/0688 |
| 2020/0134043 A1 * | 4/2020 | Demoor | ............... | G06F 16/122 |

FOREIGN PATENT DOCUMENTS

| | | | | | |
|---|---|---|---|---|---|
| CN | 100403277 | C | * | 7/2008 | ............ G06F 16/10 |
| CN | 109495601 | A | * | 3/2019 | |
| CN | 117270793 | A | * | 12/2023 | |
| ES | 2619721 | T3 | * | 6/2017 | ............ A61B 18/18 |
| WO | WO-2004064350 | A2 | * | 7/2004 | ............ H04L 29/06 |

\* cited by examiner

*Primary Examiner* — John B King
(74) *Attorney, Agent, or Firm* — Brian J. Colandreo; Heath M. Sargeant; Holland & Knight LLP

(57) ABSTRACT

A method, computer program product, and computing system for establishing a first file system protocol connection between a first storage system and a second storage system. A security descriptor of one or more electronic files on the first storage system may be queried for security-related information using the first file system protocol connection. Security-related information associated with a first file system protocol and security-related information associated with a second file system protocol may be migrated from the first storage system to the second storage system.

20 Claims, 5 Drawing Sheets

MULTI-PROTOCOL MIGRATION SYSTEM AND METHOD

BACKGROUND

Storing and safeguarding electronic content may be beneficial in modern business and elsewhere. Accordingly, various methodologies may be employed to protect and distribute such electronic content.

For example, storage systems may be upgraded or replaced which may require the migration of data from one storage system to another. However, with multiple data or file system protocols, protocol connections for each file system protocol may be required to obtain all the protocol-specific information. Additionally, multi-protocol migration of data using several protocol connections may require significant file system protocol path resolution time which degrade storage system performance during migration.

Summary of Disclosure

In one example implementation, a computer-implemented method executed on a computing device may include, but is not limited to, establishing a first file system protocol connection between a first storage system and a second storage system. A security descriptor of one or more electronic files on the first storage system may be queried for security-related information using the first file system protocol connection. Security-related information associated with a first file system protocol and security-related information associated with a second file system protocol may be migrated from the first storage system to the second storage system.

One or more of the following example features may be included. The one or more electronic files may be accessible using the first file system protocol and the second file system protocol. The first file system protocol may be Common Internet File System (CIFS). The security-related information associated with the first file system protocol may include one or more of: an owner security identifier (SID), a group SID, and an access control list. The second file system protocol may be Network File System (NFS). The security-related information associated with the second file system protocol may include one or more of: a user identifier (UID), a group identifier (GID), and one or more permission mode bits. The security-related information associated with the second file system protocol may be encoded in the security descriptor of the one or more electronic files.

In another example implementation, a computer program product resides on a computer readable medium that has a plurality of instructions stored on it. When executed by a processor, the instructions cause the processor to perform operations that may include, but are not limited to, establishing a first file system protocol connection between a first storage system and a second storage system. A security descriptor of one or more electronic files on the first storage system may be queried for security-related information using the first file system protocol connection. Security-related information associated with a first file system protocol and security-related information associated with a second file system protocol may be migrated from the first storage system to the second storage system.

One or more of the following example features may be included. The one or more electronic files may be accessible using the first file system protocol and the second file system protocol. The first file system protocol may be Common Internet File System (CIFS). The security-related information associated with the first file system protocol may include one or more of: an owner security identifier (SID), a group SID, and an access control list. The second file system protocol may be Network File System (NFS). The security-related information associated with the second file system protocol may include one or more of: a user identifier (UID), a group identifier (GID), and one or more permission mode bits. The security-related information associated with the second file system protocol may be encoded in the security descriptor of the one or more electronic files.

In another example implementation, a computing system includes at least one processor and at least one memory architecture coupled with the at least one processor, wherein the at least one processor configured to establish a first file system protocol connection between a first storage system and a second storage system. A security descriptor of one or more electronic files on the first storage system may be queried for security-related information using the first file system protocol connection. Security-related information associated with a first file system protocol and security-related information associated with a second file system protocol may be migrated from the first storage system to the second storage system.

One or more of the following example features may be included. The one or more electronic files may be accessible using the first file system protocol and the second file system protocol. The first file system protocol may be Common Internet File System (CIFS). The security-related information associated with the first file system protocol may include one or more of: an owner security identifier (SID), a group SID, and an access control list. The second file system protocol may be Network File System (NFS). The security-related information associated with the second file system protocol may include one or more of: a user identifier (UID), a group identifier (GID), and one or more permission mode bits. The security-related information associated with the second file system protocol may be encoded in the security descriptor of the one or more electronic files.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
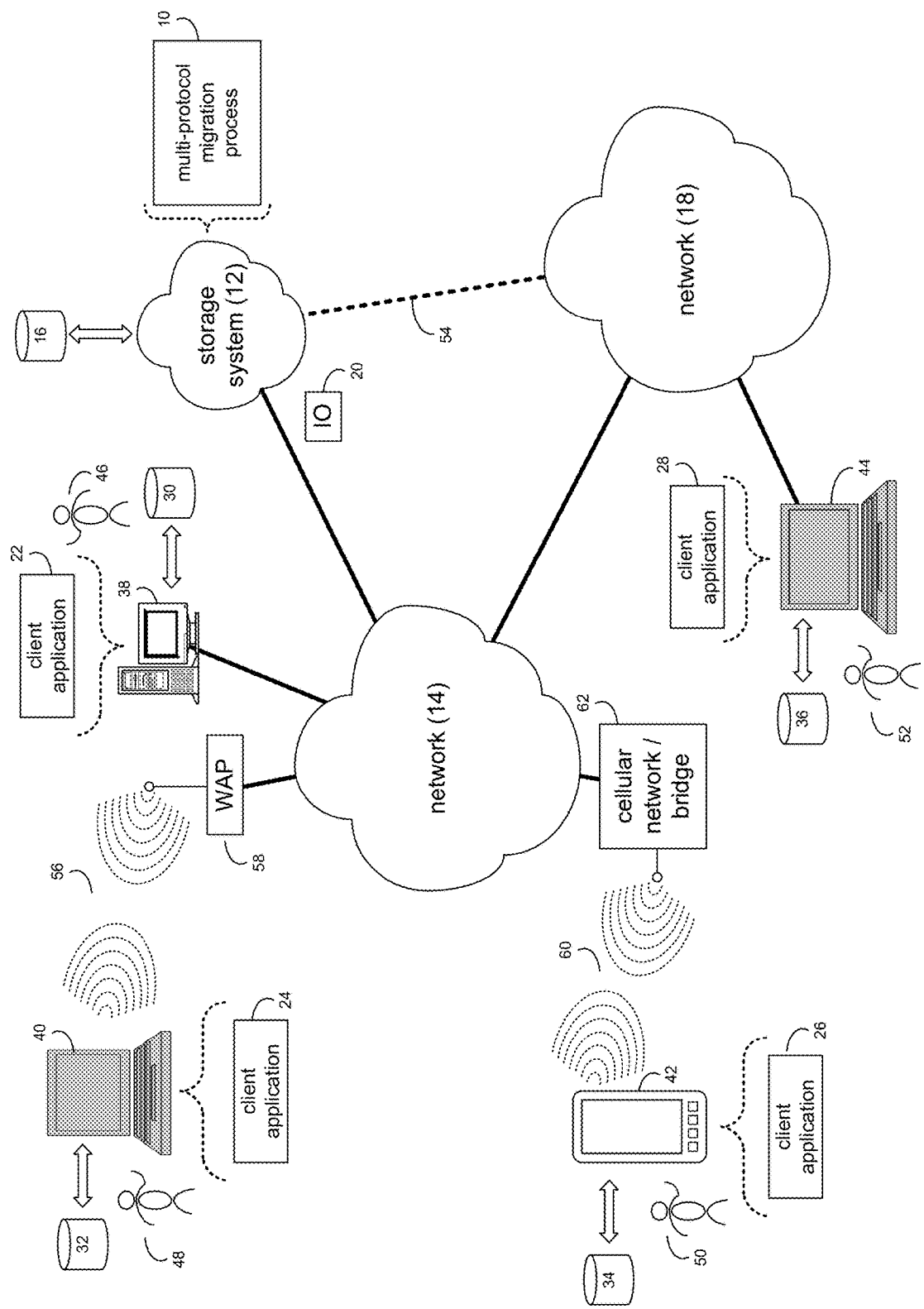
FIG. 1 is an example diagrammatic view of a storage system and a multi-protocol migration process coupled to a distributed computing network according to one or more example implementations of the disclosure.

System Overview:

Referring to FIG. 1, there is shown multi-protocol migration process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of multi-protocol migration process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of multi-protocol migration process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a multi-protocol migration process, such as multi-protocol migration process 10 of FIG. 1, may include but is not limited to, establishing a first file system protocol connection between a first storage system and a second storage system. A security descriptor of one or more electronic files on the first storage system may be queried for security-related information using the first file system protocol connection. Security-related information associated with a first file system protocol and security-related information associated with a second file system protocol may be migrated from the first storage system to the second storage system.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
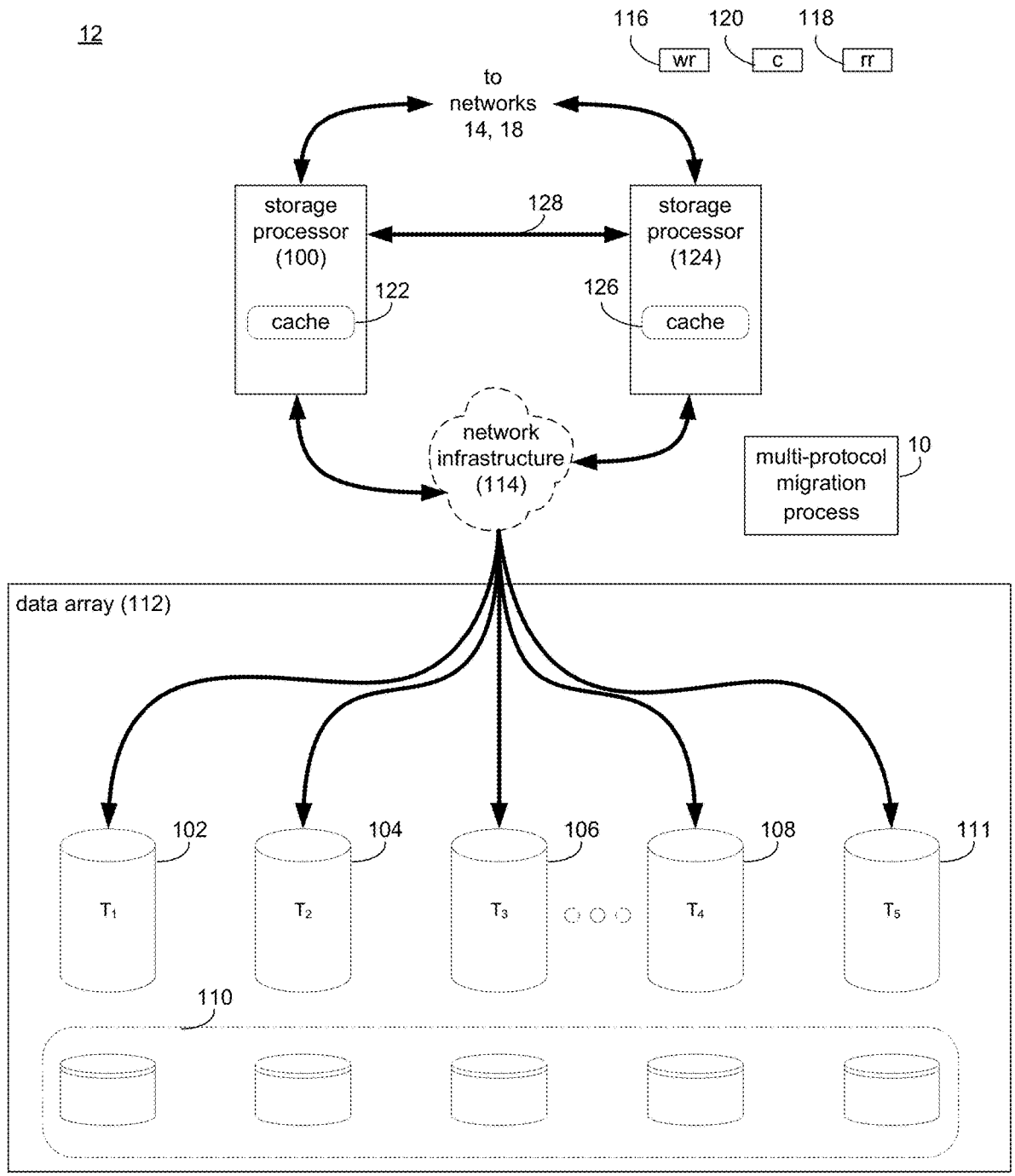
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of multi-protocol migration process 10. The instruction sets and subroutines of multi-protocol migration process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of multi-protocol migration process 10 may be stored on storage devices (and/or executed by processors and memory architectures) that are external to storage system 12.

As discussed above, various TO requests (e.g. TO request 20) may be generated. For example, these TO requests may be sent from client applications 22, 24, 26, 28 to storage system 12. Additionally/alternatively and when storage processor 100 is configured as an application server, these TO requests may be internally generated within storage processor 100. Examples of TO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of multi-protocol migration process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of multi-protocol migration process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

Figure 3:
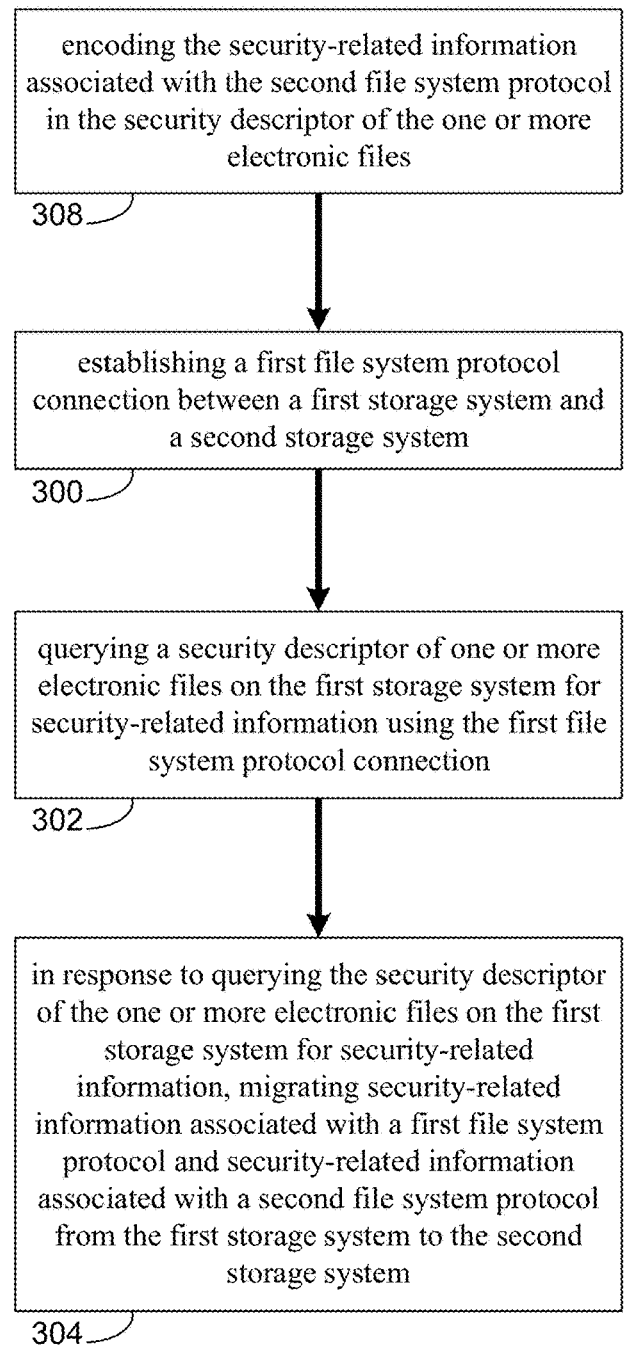
FIG. 3 is an example flowchart of multi-protocol migration process according to one or more example implementations of the disclosure.
Figure 4:
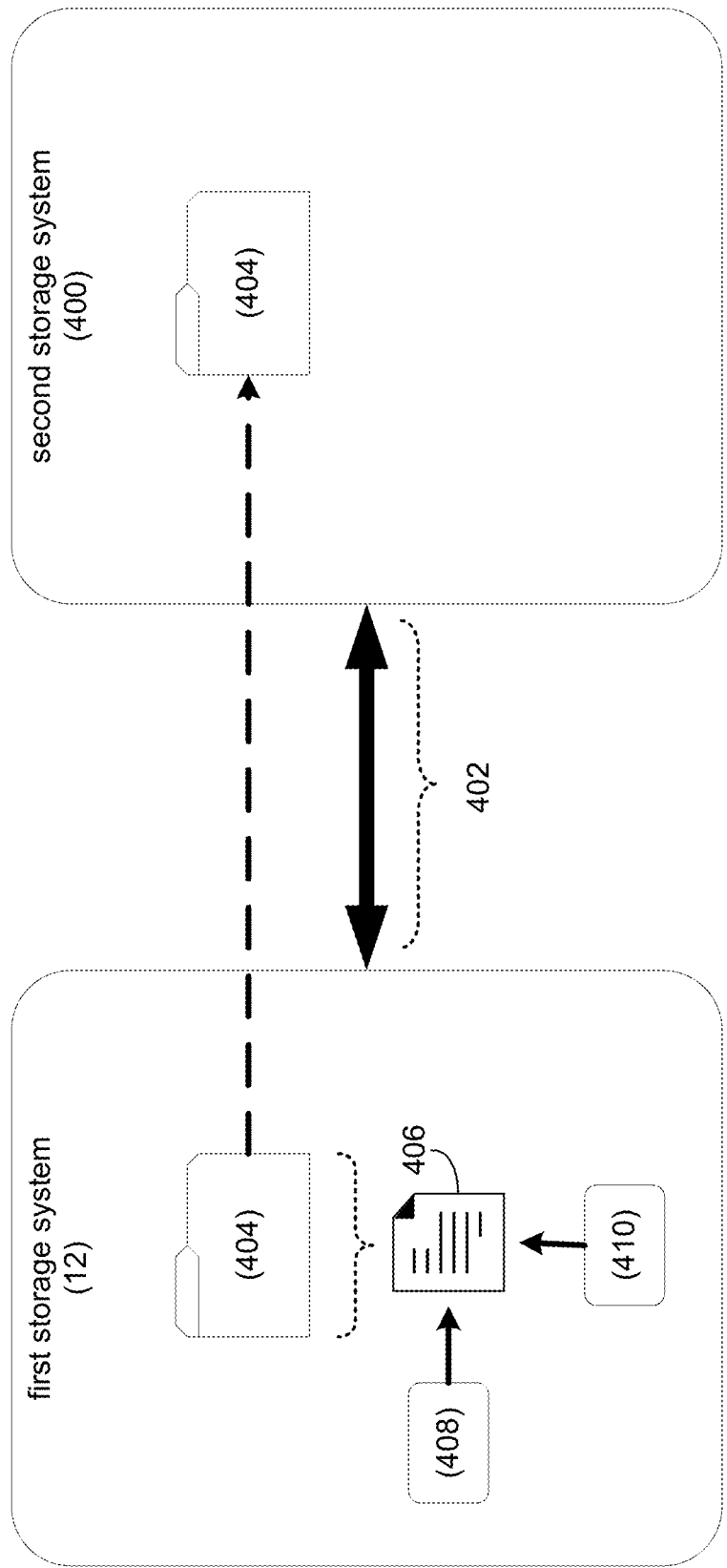
FIGS. 4-5 are example diagrammatic views of the storage system of FIG. 1 according to one or more example implementations of the disclosure.
Figure 5:
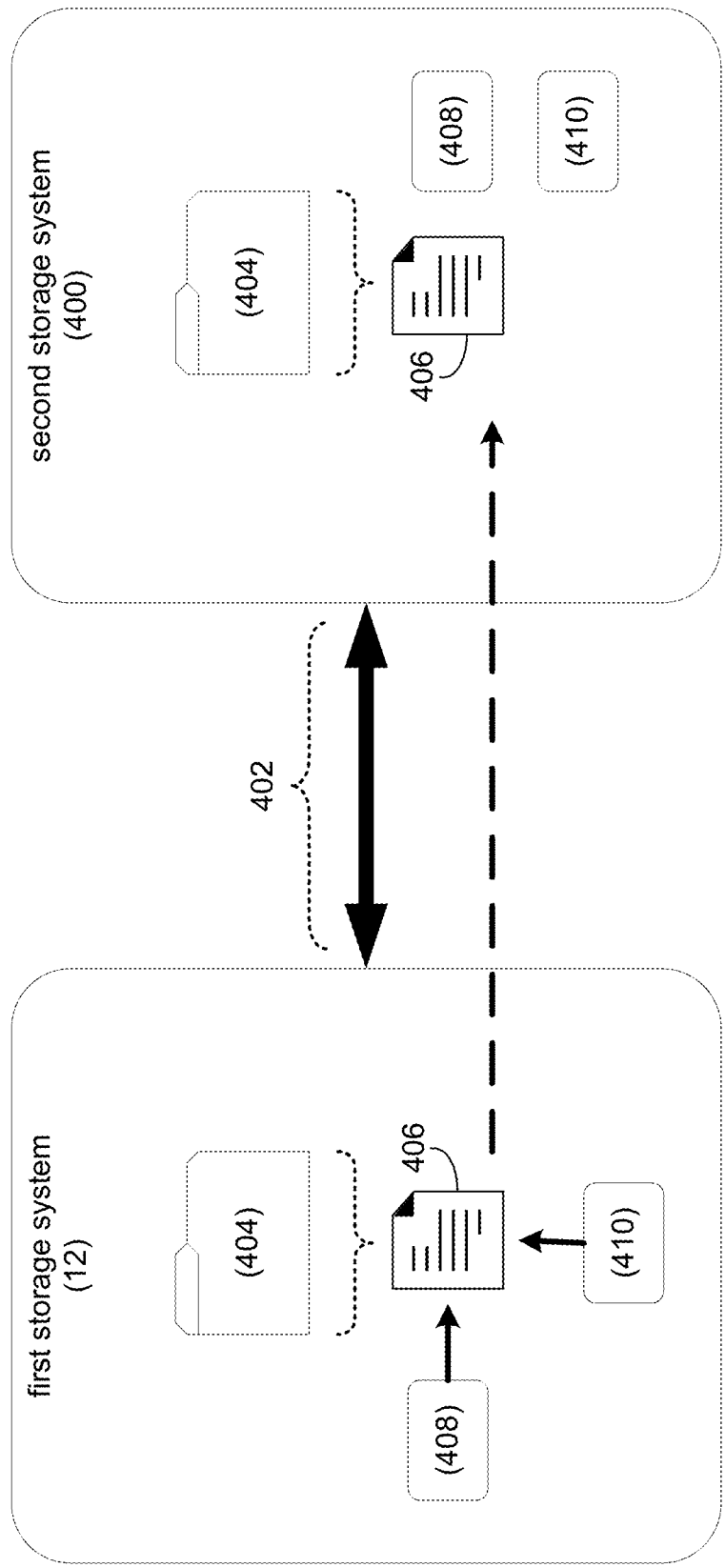

The Multi-Protocol Management Process:

Referring also to the examples of FIGS. 3-5 and in some implementations, multi-protocol migration process 10 may establish 300 a first file system protocol connection between a first storage system and a second storage system. A security descriptor of one or more electronic files on the first storage system may be queried 302 for security-related information using the first file system protocol connection. Security-related information associated with a first file system protocol and security-related information associated with a second file system protocol may be migrated 304 from the first storage system to the second storage system.

As will be discussed in greater detail below, multi-protocol migration process 10 may allow for multi-protocol file systems to be migrated from one storage system to another using a single file system protocol connection. For example and as discussed above, storage systems may be upgraded or replaced which may require the migration of data from one storage system to another. However, with multiple data or file system protocols, protocol connections for each file system protocol may be required to obtain all the protocol-specific information. Additionally, multi-protocol migration of data using several protocol connections may require significant file system protocol path resolution time which degrade storage system performance during migration.

For example, in a multi-file system protocol environment, users may use one file system protocol (e.g., Network File System (NFS)) to access files and, at other times, may use another file system protocol (e.g., Common Internet File System (CIFS)) to access files. However, security-related information of one file system protocol may be unobtainable using another file system protocol according to conventional approaches. As such, during migration, a NFS protocol client may only obtain NFS-related security information while a CIFS protocol client may only obtain CIFS related security information. In this manner, conventional approaches utilize separate file system protocol connections between storage systems during migration to obtain each file system protocol's unique data (e.g., security-related information). However, the NFS protocol does not support passing a path to query information from a source file and may have to either lookup or utilize directory commands (e.g., readdir( )) to get each component in the path one by one, or use NFS handle.

Additionally, the CIFS protocol does not support using a handle to get the security information and requires using a full path. This becomes a problem during migration where migrating one file would require building a CIFS path to query CIFS-related security information and traverse the path to look for NFS files through the NFS protocol to get NFS-related information. The lookup process of conventional approaches requires sending commands through an NFS connection which increases in the amount of time required to resolve the path for migrating the file. As such, this conventional approach results in a performance penalty when migrating security-related information in a multi-file system protocol environment. As will be discussed in greater detail below, multi-protocol migration process 10 may allow for multi-protocol file systems to be migrated from one storage system to another using a single file system protocol connection.

In some implementations, multi-protocol migration process 10 may establish 300 a first file system protocol connection between a first storage system and a second storage system. For example and referring also to FIG. 4, multi-protocol migration process 10 may generally involve migrating data (e.g., electronic files) from a first storage system (e.g., storage system 12) to a second storage system (e.g., storage system 400). In this example, suppose that storage system 12 represents a legacy storage system that is being upgraded with storage system 400. In another example, storage system 12 may be being replaced with a new version of the same or at least a generally similar storage system (e.g., storage system 400). While two examples have been provided, it will be appreciated that there are many situations or motivations for migrating the content of one storage system to another storage system within the scope of the present disclosure.

As discussed above and in some implementations, the one or more electronic files may be accessible using the first file system protocol and the second file system protocol. For example, multi-protocol migration process 10 may utilize a first file system protocol to access one or more electronic files (e.g., file 402) within a storage system. Multi-protocol migration process 10 may also utilize another file system protocol to access the same files (e.g., file 402) within the storage system. However, certain information may only be accessible to a particular file system protocol.

In some implementations, the first file system protocol may be the Common Internet File System (CIFS) protocol. As is known in the art, CIFS is a network file system protocol used for providing shared access to files between machines on a network. For example, according to the CIFS protocol, a client requests a file (e.g., file 402) from a server program located on another computer, and the server responds with the request file.

Multi-protocol migration process 10 may establish 300 a first file system protocol connection (e.g., first file system protocol connection 404) between the first storage system (e.g., storage system 12) and the second storage system (e.g., storage system 400). Establishing 300 the first file system protocol connection may generally include providing an interface or communication path between storage system 12 and storage system 400. Multi-protocol migration process 10 may automatically configure first file system protocol connection 404 in response to a request to migrate file 402 from storage system 12 to storage system 400. For example, a user may provide a request to multi-protocol migration process 10 to migrate file 402 from storage system 12 to storage system 400. Multi-protocol migration process 10 may provide a user interface and/or command line for receiving the request to migrate file 402. In response to this request, multi-protocol migration process 10 may establish 300 first file system protocol connection 404 by opening a communication path for data (e.g., file 402) to pass from storage system 12 to storage system 400. In some implementations, first file system protocol connection 404 may be a physical connection (e.g., one or more wires) and/or a network-based connection (e.g., each of storage systems 12, 400 being configured to communicate over network 14).

As discussed above, the first file system protocol connection (e.g., first file system protocol connection 404) may be a CIFS protocol connection between storage system 12 and storage system 400. As will be discussed in greater detail below, multi-protocol migration process 10 may allow security-related information associated with the first file system protocol (e.g., CIFS protocol) and security-related information associated with the second file system protocol (e.g., NFS protocol) to be queried and migrated from storage system 12 to storage system 400 with only a single file system protocol connection (e.g., first file system protocol connection 404).

In some implementations, multi-protocol migration process 10 may query 302 a security descriptor of one or more electronic files on the first storage system for security-related information using the first file system protocol connection. A security descriptor may generally include a data structure configured to store access control lists that determine what actions a user can perform on files and folders, and what is audited when a user accesses files and folders. In some implementations, a security descriptor (e.g., security descriptor 406) may be associated with a particular file (e.g., file 402). For example, security descriptor 406 may include metadata generated when various security-related information for file 402 is defined. In one example, security descriptor 406 may be at least partially defined with security-related information for file 402 when file 402 is created. In another example, security descriptor 406 may be modified at any point in the use or processing of file 402. In this manner, multi-protocol migration process 10 may obtain updated security-related information for file 402 at any point in time by referencing security descriptor 406. As will be discussed in greater detail below, security-related information may include security-related information that is associated with, and exclusive to, each file system protocol.

For example, security-related information defined within the security descriptor may include security-related information associated with the first file system protocol (e.g., first file system protocol security-related information 408). First file system protocol security-related information 408 may include one or more of: an owner security identifier (SID), a group SID, and an access control list. For example and as discussed above, first file system protocol may be the CIFS protocol which includes various security-related features. An owner SID may generally include a reference to a particular user. A group SID may generally include a reference to a particular group of users. An access control list may generally describe a level of access for each user and/or group. While three examples of first file system protocol security-related information 408 have been described, it will be appreciated that this is for example purposes only and that any number or type of information may be included in the first file system protocol security-related information within the scope of the present disclosure.

As discussed above and in some implementations, the second file system protocol may be the Network File System (NFS) protocol. As is known in the art, the NFS protocol is a client-server application that permits transparent file sharing between servers, desktops, laptops, and other devices. Using NFS, users can store, view and update files remotely as though they were on their own computing device. For example, according to the NFS protocol, a client can store, view, and update file 402 remotely on the storage system (e.g., storage system 12).

As discussed above, security-related information for a file (e.g., file 402) may include security-related information associated with various file system protocols. For example, file 402 may include security-related information associated with the second file system protocol (e.g., second file system protocol security-related information 410). Second file system protocol security-related information 410 may include one or more of: a user identifier (UID), a group identifier (GID), and one or more permission mode bits. For example and as discussed above, second file system protocol may be the NFS protocol which includes various security-related features. A UID may generally include a reference to a particular user. A GID may generally include a reference to a particular group of users. The one or more permission mode bits may generally describe the level(s) of file access granted to particular uses and/or groups. While three examples of second file system protocol security-related information 410 have been described, it will be appreciated that this is for example purposes only and that any number or type of information may be included in the second file system protocol security-related information within the scope of the present disclosure.

In some implementations, multi-protocol migration process 10 may encode 304 the security-related information associated with the second file system protocol in the security descriptor of the one or more electronic files. For example, conventional data migration processes require a separate NFS connection in order to query NFS security-related information from the source file. In other words, the security descriptor (e.g., security descriptor 406) does not normally include NFS security-related information (e.g., second file system protocol security-related information 410). However, multi-protocol migration process 10 may encode 306 or otherwise store second file system protocol security-related information 410 in security descriptor 406. Specifically, multi-protocol migration process 10 may encode all the NFS security-related information (e.g., UID, GID, permission mode bits), as well as NFS basic information into the extended Access Control Entries (ACE) in security descriptor 406 for file 402. With the extended ACE, multi-protocol migration process 10 may query 302 all the security-related information through only first file system protocol connection 402 (e.g., a CIFS protocol connection) without requiring a second file system protocol connection (e.g., a NFS protocol connection). For example, multi-protocol migration process 10 may only require the first file system protocol connection (e.g., first file system protocol connection 402) to query 302 all the information because the security-related information for CIFS migration is all migrated through security descriptor 406 in the first file system protocol (e.g., the CIFS protocol).

Accordingly, querying 302 the security descriptor of one or more electronic files on the first storage system for security-related information using the first file system protocol connection may include determining the file path for querying 302 the security descriptor. For example, for the file path used to access source files (e.g., file 402), multi-protocol migration process 10 may determine the local file associated with the handle of a parent and may then build a path using the local file system's path structure to build up the full path needed by the first file system protocol (e.g., CIFS protocol) to obtain the newly created file/dir's security related information, and to apply that security-related information on local newly created files. While one example of determining the file path for querying 302 the security descriptor has been provided, it will be appreciated that various approaches may be used within the scope of the present disclosure.

In some implementations, multi-protocol migration process 10 may migrate 304 security-related information associated with a first file system protocol and security-related information associated with a second file system protocol from the first storage system to the second storage system in response to querying the security descriptor of the one or more electronic files on the first storage system for security-related information. For example, multi-protocol migration process 10 may migrate 304 or transfer the security-relation information (e.g., first file system protocol security-related information 408 and second file system protocol security-related information 410) from the first storage system (e.g., storage system 12) to the second storage system (e.g., storage system 400).

Referring also to FIG. 5, multi-protocol migration process 10 may migrate 304 file 402, including the security-related information (e.g., first file system protocol security-related information 408 and second file system protocol security-related information 410) from the first storage system (e.g., storage system 12) to the second storage system (e.g., storage system 400) such that file 402 is accessible on storage system 400 using either the first file system protocol or the second file system protocol. As discussed above, multi-protocol migration process 10 may enhance the migration performance of the storage systems by using only a first file system protocol connection to query and migrate security-related information associated with a file.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    establishing a first file system protocol connection between a first storage system and a second storage system, wherein the first file system protocol connection is a single file system protocol connection between the first storage system and the second storage system;
    querying a security descriptor of one or more electronic files on the first storage system for security-related information using the first file system protocol connection; and
    in response to querying the security descriptor of the one or more electronic files on the first storage system for security-related information, migrating security-related information associated with a first file system protocol and security-related information associated with a second file system protocol from the first storage system to the second storage system with only the first file system protocol connection.

2. The computer-implemented method of claim 1, wherein the one or more electronic files are accessible using the first file system protocol and the second file system protocol.

3. The computer-implemented method of claim 1, wherein the first file system protocol is Common Internet File System (CIFS).

4. The computer-implemented method of claim 3, wherein the security-related information associated with the first file system protocol includes one or more of: an owner security identifier (SID), a group SID, and an access control list.

5. The computer-implemented method of claim 1, wherein the second file system protocol is Network File System (NFS).

6. The computer-implemented method of claim 5, wherein the security-related information associated with the second file system protocol includes one or more of: a user identifier (UID), a group identifier (GID), and one or more permission mode bits.

7. The computer-implemented method of claim 1, further comprising:
  encoding the security-related information associated with the second file system protocol in the security descriptor of the one or more electronic files.

8. A computer program product residing on a non-transitory computer readable medium having a plurality of instructions stored thereon which, when executed by a processor, cause the processor to perform operations comprising:
  establishing a first file system protocol connection between a first storage system and a second storage system, wherein the first file system protocol connection is a single file system protocol connection between the first storage system and the second storage system;
  querying a security descriptor of one or more electronic files on the first storage system for security-related information using the first file system protocol connection; and
  in response to querying the security descriptor of the one or more electronic files on the first storage system for security-related information, migrating security-related information associated with a first file system protocol and security-related information associated with a second file system protocol from the first storage system to the second storage system with only the first file system protocol connection.

9. The computer program product of claim 8, wherein the one or more electronic files are accessible using the first file system protocol and the second file system protocol.

10. The computer program product of claim 8, wherein the first file system protocol is Common Internet File System (CIFS).

11. The computer program product of claim 10, wherein the security-related information associated with the first file system protocol includes one or more of: an owner security identifier (SID), a group SID, and an access control list.

12. The computer program product of claim 8, wherein the second file system protocol is Network File System (NFS).

13. The computer program product of claim 12, wherein the security-related information associated with the second file system protocol includes one or more of: a user identifier (UID), a group identifier (GID), and one or more permission mode bits.

14. The computer program product of claim 8, wherein the operations further comprise:
  encoding the security-related information associated with the second file system protocol in the security descriptor of the one or more electronic files.

15. A computing system comprising:
  a memory; and
  a processor configured to establish a first file system protocol connection between a first storage system and a second storage system, wherein the first file system protocol connection is a single file system protocol connection between the first storage system and the second storage system, wherein the processor is further configured to query a security descriptor of one or more electronic files on the first storage system for security-related information using the first file system protocol connection, and wherein the processor is further configured to, in response to querying the security descriptor of the one or more electronic files on the first storage system for security-related information, migrate security-related information associated with a first file system protocol and security-related information associated with a second file system protocol from the first storage system to the second storage system with only the first file system protocol connection.

16. The computing system of claim 15, wherein the one or more electronic files are accessible using the first file system protocol and the second file system protocol.

17. The computing system of claim 15, wherein the first file system protocol is Common Internet File System (CIFS).

18. The computing system of claim 17, wherein the security-related information associated with the first file system protocol includes one or more of: an owner security identifier (SID), a group SID, and an access control list.

19. The computing system of claim 15, wherein the second file system protocol is Network File System (NFS).

20. The computing system of claim 19, wherein the security-related information associated with the second file system protocol includes one or more of: a user identifier (UID), a group identifier (GID), and one or more permission mode bits.

* * * * *